US011398723B2

(12) United States Patent
Choi (10) Patent No.: US 11,398,723 B2
(45) Date of Patent: Jul. 26, 2022

(54) BATTERY CONTROL APPARATUS (71) Applicant: LG CHEM, LTD., Seoul (KR)

(72) Inventor: Jang Hyeok Choi, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 0 days.

(21) Appl. No.: 17/269,884

(22) PCT Filed: Dec. 3, 2019

(86) PCT No.: PCT/KR2019/016948
§ 371 (c)(1),
(2) Date: Feb. 19, 2021

(87) PCT Pub. No.: WO2020/116905
PCT Pub. Date: Jun. 11, 2020

(65) Prior Publication Data
US 2021/0320488 A1    Oct. 14, 2021

(30) Foreign Application Priority Data

Dec. 5, 2018   (KR) .................. 10-2018-0155291

(51) Int. Cl.
H02H 3/18       (2006.01)
H02J 7/00       (2006.01)
H02H 7/18       (2006.01)

(52) U.S. Cl.
CPC ............... *H02H 3/18* (2013.01); *H02J 7/18* (2013.01); *H02J 7/00304* (2020.01); *H02J 7/00308* (2020.01)

(58) Field of Classification Search
CPC ......... H02H 7/18; H02H 3/18; H02J 7/00308; H02J 7/00304

(Continued)

(56) References Cited

U.S. PATENT DOCUMENTS 8,410,746 B2 * 4/2013 Lee .................. H03K 17/0828
                                                       318/801
9,438,148 B2 * 9/2016 Fuse ........................ H02P 6/12
(Continued)

FOREIGN PATENT DOCUMENTS

JP      7-70391 B2     7/1995
JP      2013-89411 A   5/2013
(Continued)

OTHER PUBLICATIONS

International Search Report for PCT/KR2019/016948 (PCT/ISA/210) dated Mar. 20, 2020.
(Continued)

*Primary Examiner* — Yemane Mehari
(74) *Attorney, Agent, or Firm* — Birch, Stewart, Kolasch & Birch, LLP (57) ABSTRACT A battery control apparatus includes: an MCU including a first control terminal, a first sensing terminal connected to a first node, a second control terminal, a third control terminal, a second sensing terminal connected to a second node, and a fourth control terminal; a relay including a switch and a coil connected between the first node and the second node; and a first reduction circuit including a first transistor having a first gate connected to the first control terminal and a first end connected to the first node, and a second transistor having a second gate connected to the second control terminal and the MCU controls the first gate and the second gate to respectively allow the first transistor to be turned on and the second transistor to be turned off when there is no voltage change of the first node.

10 Claims, 4 Drawing Sheets (58) Field of Classification Search
USPC .......................................................... 361/111
See application file for complete search history.

(56) References Cited

U.S. PATENT DOCUMENTS

| | | | |
|---|---|---|---|
| 2002/0167777 A1 | 11/2002 | Parisi et al. | |
| 2012/0106021 A1* | 5/2012 | Suchoff | H01H 47/04 361/194 |
| 2020/0028369 A1* | 1/2020 | Lupo | H01M 50/543 |
| 2020/0083009 A1 | 3/2020 | Oshita et al. | |

FOREIGN PATENT DOCUMENTS

| | | |
|---|---|---|
| JP | 2015-122610 A | 7/2015 |
| JP | 2018-170248 A | 11/2018 |
| KR | 10-2005-0065185 A | 6/2005 |
| KR | 10-1014152 B1 | 2/2011 |
| KR | 10-2013-0053553 A | 5/2013 |
| KR | 10-2015-0024595 A | 3/2015 |
| KR | 10-1498837 B1 | 3/2015 |
| KR | 10-2017-0061557 A | 6/2017 |
| WO | WO 2018/139636 A1 | 8/2018 |

OTHER PUBLICATIONS

Extended European Search Report for European Application No. 19892126.4, dated Sep. 29, 2021.

\* cited by examiner

BATTERY CONTROL APPARATUS

CROSS-REFERENCE WITH RELATED APPLICATION(S)

This application claims priority to and the benefit of Korean Patent Application No. 10-2018-0155291 filed in the Korean Intellectual Property Office on Dec. 5, 2018, the entire contents of which are incorporated herein by reference.

TECHNICAL FIELD

The present invention relates to a battery control apparatus.

BACKGROUND ART

In general, a BMS (Battery Management System) generates a magnetic field when a current flows through a coil included in a relay, and the relay operates by a force of the magnetic field. Specifically, the relay is configured to include a coil that is magnetized or demagnetized, and a switch that is closed by a magnetic force when the coil is magnetized and opened when the coil is demagnetized. When such a switch is opened due to an abnormal condition of the battery, a reverse surge is generated in the coil, and this reverse surge may damage electronic components such as microcomputers and semiconductor elements constituting a battery system.

Conventionally, a freewheeling diode, a zener diode, or the like is used to cancel a reverse surge, but when such a diode is used, the number of parts of the battery system increases, and thus a unit cost of the battery system increases.

DISCLOSURE

Technical Problem

The present invention has been made in an effort to overcome the above-described problems, and is intended to effectively cancel a reverse surge generated in the battery control apparatus.

Technical objects desired to be achieved in the present invention are not limited to the aforementioned objects, and other technical objects not described above will be apparent to those skilled in the art from the disclosure of the present invention.

Technical Solution

The present invention provides a battery control apparatus, and this battery control device includes: an MCU includes a first control terminal, a first sensing terminal connected to a first node, a second control terminal, a third control terminal, a second sensing terminal connected to a second node, and a fourth control terminal, the MCU is configured to sense voltage changes of the first node and the second node; a relay including a switch and a coil, the switch and the coil of the relay are connected between the first node and the second node; and a first reduction circuit configured to include a first transistor having a first gate connected to the first control terminal and a first end connected to the first node, and a second transistor having a second gate connected to the second control terminal, a first end connected to the first node, and a second end connected to the second node, wherein when there is no voltage change of the first node, the MCU is configured to control the first gate and the second gate to respectively allow the first transistor to be turned on and the second transistor to be turned off.

According to an exemplary embodiment, when a voltage of the first node is changed from a first voltage to a second voltage, the MCU of the battery control apparatus may be configured to control the second gate to form a first path via the second transistor.

According to an exemplary embodiment, when a potential of the first node becomes a ground potential, the MCU of the battery control apparatus may be configured to control the switch to be turned off.

In addition, according to an exemplary embodiment, the battery control apparatus may further include a second reduction circuit configured to include a third transistor having a third gate connected to the third control terminal, a first end connected to the first node, a second end connected to the second node, and a fourth transistor having a fourth gate connected to the fourth control terminal, a first end connected to the second node, and a second end connected to a ground.

According to an exemplary embodiment, when there is no voltage change in the second node, the MCU of the battery control apparatus may be configured to control the third gate and the fourth gate to respectively allow the third transistor to be turned off and the fourth transistor to be turned on.

According to an exemplary embodiment, when a voltage of the second node is changed from the second voltage to the first voltage the MCU of the battery control apparatus may be configured to control the third gate to form a second path via the third transistor.

According to an exemplary embodiment, when there is no voltage change in the first node and the second node the MCU of the battery control apparatus may be configured to control the first gate to the fourth gate to respectively allow the first transistor and the fourth transistor to be turned on and the second transistor and the third transistor to be turned off.

According to an exemplary embodiment, when the voltage of the first node is changed from the first voltage to the second voltage and the voltage of the second node is changed from the second voltage to the first voltage the MCU of the battery control apparatus may be configured to respectively control the second gate and the third gate to form a third path via the second transistor and the third transistor.

The switch of the battery control apparatus may be turned on or off depending on a magnetic field generated by the coil.

In addition, the first voltage of the battery control apparatus may be higher than the second voltage.

Advantageous Effects

The battery control system according to the present invention may effectively cancel a reverse surge.

MODE FOR INVENTION

Hereinafter, exemplary embodiments disclosed in the present specification will be described in detail with reference to the accompanying drawings. In the present specification, the same or similar components will be denoted by the same or similar reference numerals, and a repeated description thereof will be omitted. Terms "module" and "unit" for components used in the following description are used only in order to easily describe the specification. Therefore, these terms do not have meanings or roles that distinguish them from each other in and of themselves. In describing exemplary embodiments of the present specification, when it is determined that a detailed description of the well-known art associated with the present invention may obscure the gist of the present invention, it will be omitted. The accompanying drawings are provided only in order to allow exemplary embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

Terms including ordinal numbers such as first, second, and the like will be used only to describe various components, and are not to be interpreted as limiting these components. The terms are only used to differentiate one component from other components.

It is to be understood that when one component is referred to as being "connected" or "coupled" to another component, it may be connected or coupled directly to the other component or be connected or coupled to the other component with a further component intervening therebetween. On the other hand, it is to be understood that when one component is referred to as being "connected or coupled directly" to another component, it may be connected to or coupled to the other component without another component intervening therebetween.

Singular forms are to include plural forms unless the context clearly indicates otherwise.

It will be further understood that terms "comprises" or "have" used in the present specification specify the presence of stated features, numerals, steps, operations, components, parts, or a combination thereof, but do not preclude the presence or addition of one or more other features, numerals, steps, operations, components, parts, or a combination thereof.

Hereinafter, a battery control apparatus according to an exemplary embodiment will be described with reference to FIG. 1.

Figure 1:
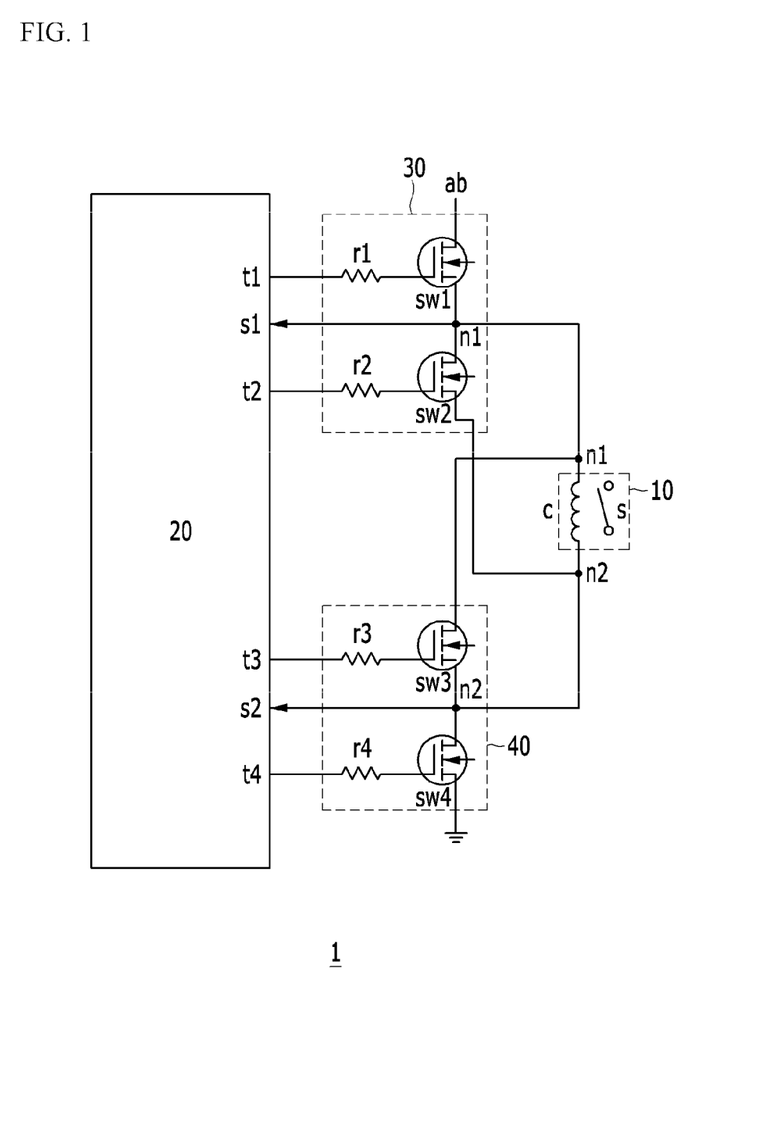
FIG. 1 illustrates a configuration of a battery control apparatus according to an exemplary embodiment.

Referring to FIG. 1, the battery control apparatus 1 according to the present exemplary embodiment includes a relay 10, a micro control unit (MCU) 20, a first reduction circuit 30, and a second reduction circuit 40, and the battery control apparatus 1 controls the first reduction circuit 30 and/or the second reduction circuit 40 to form a reverse surge reduction path such that a reverse surge generated in the relay 10 is exhausted.

The relay 10 includes a coil c and a switch s. The coil c is connected between a first node n1 and a second node n2. When a relay driving current flows through the coil c, a magnetic field is generated around the coil, and the switch s is turned on or off depending on a force of the magnetic field. A main battery, a battery charger, and a load may be connected to the switch s, but the exemplary embodiments are not limited thereto.

The MCU 20 includes a first control terminal t1, a second control terminal t2, a third control terminal t3, a fourth control terminal t4, a first sensing terminal s1 connected to the first node n1, and a second sensing terminal s2 connected to the second node n2. The MCU 20 senses a voltage of the first node n1 and generates a first gate signal and a second gate signal depending on the voltage of the first node n1.

The MCU 20 controls the first reduction circuit 30 depending on the first gate signal and the second gate signal such that a first path ro1 (see FIG. 2) for canceling the reverse surge generated in the relay 10 is formed.

The MCU 20 determines an operation mode of the battery control apparatus 1 according to the exemplary embodiment. Specifically, the MCU 20 grasps a state of a battery connected to the relay 10, and controls the switch s to be turned on or off in any one mode among an initial mode I, a first normal mode N1, a second normal mode N2, a first safe mode Se1, a second safe mode Se2, and a third safe mode Se3.

The initial mode I is a mode in which the battery controller 1 is initially operated, and the MCU 20 controls the switch s to be turned off.

When the state of the battery is included in a normal range, the MCU 20 controls the switch s to be turned on in the first normal mode N1, and controls the switch s to be turned off in the second normal mode N2.

When a current of the battery connected to the relay 10 is an overcurrent, a voltage thereof is an overvoltage, or a temperature thereof exceeds a predetermined temperature, the MCU 20 determines that a fire may occur in the battery, and controls the switch s to be turned off in the first safety mode Se1. In addition, the MCU 20 controls the switch s to be turned off in the second safety mode Se2 when a potential of the first node N1 becomes a ground potential, and controls the switch s to be turned off in the third safety mode Se3 when a potential of the second node n2 is equal to that of the battery connected to the relay 10.

The MCU 20 senses the voltage of the second node n2 and produces a third gate signal and a fourth gate signal. The MCU 20 controls the second reduction circuit 40 depending on the third gate signal and the forth gate signal such that a second path ro2 (see FIG. 3) for canceling the reverse surge generated in the relay 10 is formed depending on the voltage of the second node n2.

The first reduction circuit 30 includes a first transistor sw1, a second transistor sw2, a first resistor r1, and a second resistor r2. The first transistor sw1 has a gate connected to the first control terminal t1 through the first resistor r1, a first end connected to the auxiliary battery ab for applying a drive voltage (e.g., 12 V) of the relay 10, and a second end connected to the first node n1, and is turned on or off depending on a first gate signal of an enable level. The second transistor sw2 has a gate connected to the second control terminal t2 through the second resistor r2, a first end connected to the first node n1, and a second end connected to the second node n2, and is turned on or off depending on a second gate signal of an enable level.

The second reduction circuit 40 includes a third transistor sw3, a fourth transistor sw4, a third resistor r3, and a fourth resistor r4. The third transistor sw3 has a gate connected to the third control terminal t3 through the third resistor r3, a first end connected to the first node n1, and a second end connected to the second node n2, and is turned on or off depending on a third gate signal of an enable level. The fourth transistor sw4 has a gate connected to the fourth control terminal t4 through the fourth resistor r4, a first end connected to the second node n2, and a second end connected to a ground, and is turned on or off depending on a fourth gate signal of an enable level.

Figure 2:
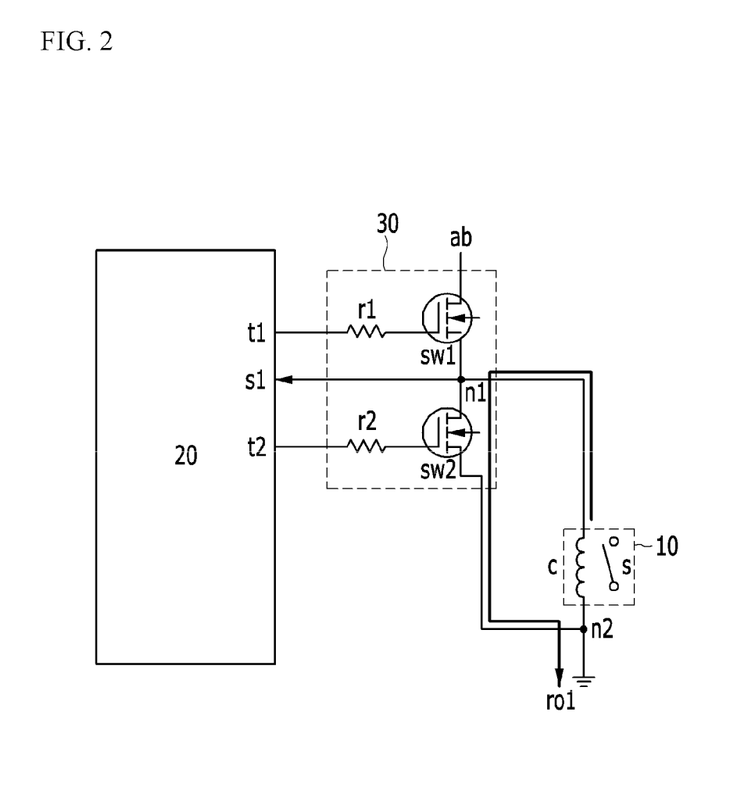
FIG. 2 illustrates a first path for reducing a reverse surge according to an exemplary embodiment.

Hereinafter, a path in which a reverse surge is reduced according to an exemplary embodiment will be described with reference to FIG. 2. FIG. 2 illustrates the first path ro1 for reducing the reverse surge according to an exemplary embodiment, and a configuration connected to the second reduction circuit 40 is omitted.

In the initial mode I, voltages of the first control terminal t1, the second control terminal t2, and a first sensing terminal s1 have a disable level (e.g., low L), and the switch s is maintained to be turned off, and thus no reverse surge is generated in the coil c.

In the first normal mode N1, the switch s is maintained to be turned on and there is no voltage change in the first node n1, and thus no reverse surge is generated in the coil c. The MCU 20 determines the first normal mode N1 by sensing the voltage of the first node n1, and generates a signal of the first control terminal t1 having an enable (e.g., high H) level and a signal of the second control terminal t2 having a disable level. Accordingly, the first transistor sw1 is turned on and the second transistor sw2 is turned off, to form the first path ro1.

In the second normal mode N2 and the first safe mode Se1, when the switch s is changed from an off state to an on state, the reverse surge is generated in the coil c to change the voltage of the first node n1 from the high level H to the low level L. In addition, when a potential of the first node N1 becomes a ground potential, the switch s is turned off in the second safe mode Se2 and the reverse surge is generated, so that the voltage of the first node n1 is changed from the high level H to the low level L.

The MCU 20 determines that the reverse surge has occurred in the coil c by sensing the voltage of the first node n1, and generates a signal of the first control terminal t1 having a disable level L and a signal of the second control terminal t2 having an enable level H. Accordingly, the first transistor sw1 is turned off and the second transistor sw2 is turned on to form the first path ro1 through the second transistor sw2. The reverse surge is reduced by escaping to the ground through the first path ro1.

Table 1 below summarizes a case in which the first path ro1 according to the above-described exemplary embodiment is generated.

TABLE 1

| Mode | t1 | t2 | s1 | Switch s | Reduction path |
|---|---|---|---|---|---|
| I | L | L | L | OFF | — |
| N1 | L → H | H → L | H | ON | — |
| N2 | H → L | L → H | H → L | OFF | ro1 |
| Se1 | H → L | L → H | H → L | OFF | ro1 |
| Se2 | H → L | L → H | H → L | OFF | ro1 |

Figure 3:
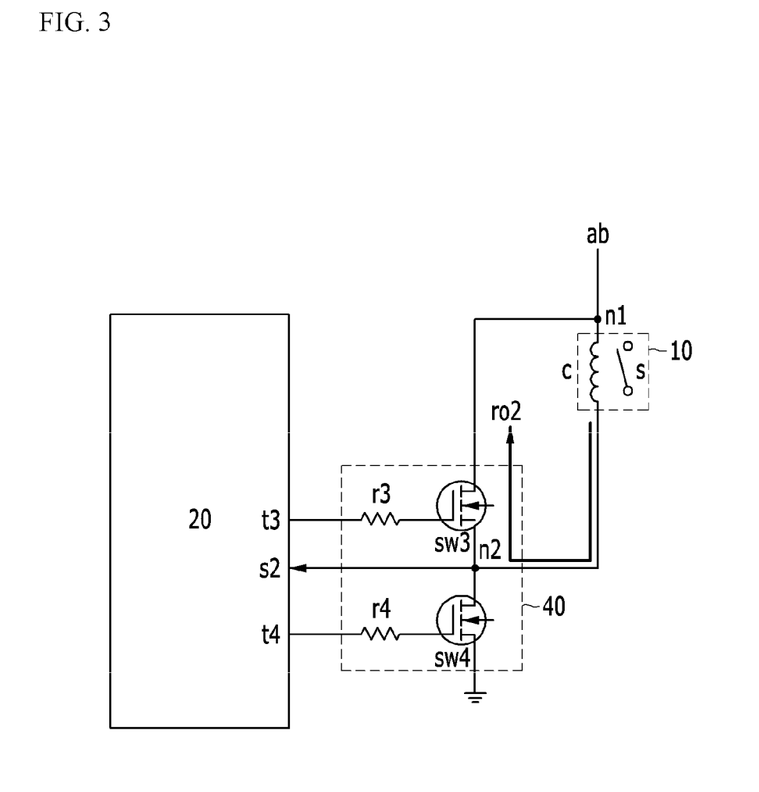
FIG. 3 illustrates a second path for reducing a reverse surge according to another exemplary embodiment.

Hereinafter, a path in which a reverse surge is reduced according to another exemplary embodiment will be described with reference to FIG. 3. FIG. 3 illustrates the second path ro2 for reducing the reverse surge according to another exemplary embodiment, and a configuration connected to the first reduction circuit 30 is omitted. Referring to FIG. 3, the auxiliary battery ab may be connected to the first node n1 of the battery control apparatus according to another exemplary embodiment.

In the initial mode I, voltages of the third control terminal t3, the fourth control terminal t4, and a second sensing terminal s2 have a disable level L, and the switch s is maintained to be turned off, and thus no reverse surge is generated in the coil c.

In the first normal mode N1, the switch s is maintained to be turned on and there is no voltage change in the second node n2, and thus no reverse surge is generated in the coil c. The MCU 20 determines the first normal mode N1 by sensing the voltage of the second node n2, and generates a signal of the third control terminal t3 having a disable level L and a signal of the fourth control terminal t4 having an enable level H. Accordingly, the third transistor sw3 is turned off and the fourth transistor sw4 is turned on, to form no second path ro2.

In the second normal mode N2 and the first safe mode Se1, when the switch s is changed from an off state to an on state, the reverse surge is generated in the coil c to change the voltage of the second node n2 from the low level L to the high level H. In addition, when the switch s is turned off in the third safety mode Se3 and the potential of the second node n2 becomes equipotential with a battery connected to the relay 10, the reverse surge is generated in the coil c, and thus the voltage of the second node n2 is changed from the low level L to the high level H.

The MCU 20 determines that the reverse surge has occurred in the coil c by sensing the voltage of the second node n2, and generates a signal of the first third terminal t3 having an enable level H and a signal of the fourth control terminal t4 having a disable level L. Accordingly, the third transistor sw3 is turned on and the fourth transistor sw4 is turned off to form the second path ro2 through the third transistor sw3.

The reverse surge flowing along the second path ro2 causes a voltage drop due to an internal resistance component of the third transistor sw3. Accordingly, the generated reverse surge is reduced as it passes through the second path ro2.

Table 2 below summarizes a case in which the second path ro2 according to the above-described exemplary embodiment is generated.

TABLE 2

| Mode | t3 | t4 | s2 | Switch s | Reduction path |
|---|---|---|---|---|---|
| I | L | L | L | OFF | — |
| N1 | L | H | L | ON | — |
| N2 | L → H | H → L | L → H | OFF | ro2 |
| Se1 | L → H | H → L | L → H | OFF | ro2 |
| Se3 | L → H | H → L | L → H | OFF | ro2 |

Figure 4:
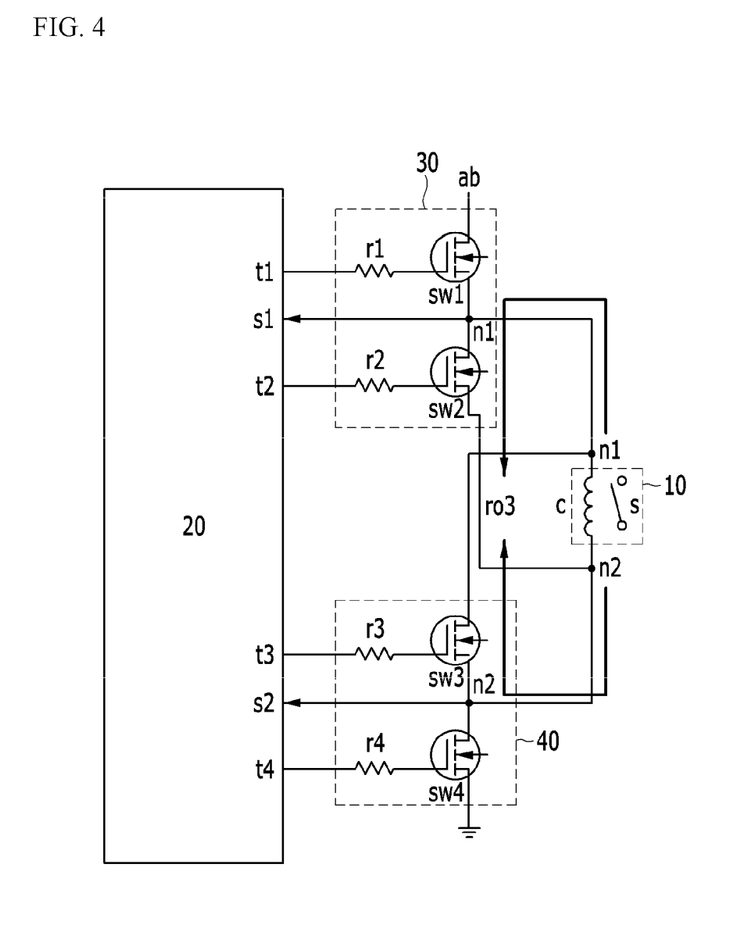
FIG. 4 illustrates a third path for reducing a reverse surge according to yet another exemplary embodiment.

Hereinafter, a path in which a reverse surge is reduced according to yet another exemplary embodiment will be described with reference to FIG. 4. FIG. 4 illustrates a third path ro3 for reducing a reverse surge according to yet another exemplary embodiment. Referring to FIG. 4, the auxiliary battery ab may be connected to a first end of the first transistor sw1.

In the initial mode I, voltages of the first to fourth control terminals t1, t2, t3, and t4 and the first to second sensing terminals s1 and s2 have a disable level L, and the switch s is maintained to be turned off, and thus no reverse surge is generated in the coil c.

In the first normal mode N1, the switch s is maintained to be turned on and there is no voltage change in the first node n1 and the second node n2, and thus no reverse surge is generated in the coil c. The MCU 20 determines the first normal mode N1 by sensing the voltages of the first node n1 and the second node n2, and generates the signals of the first control terminal t1 and the fourth control terminal t4 having the enable level H, and the signals of the second control terminal t2 and the third control terminal t3 having the disable level L. Accordingly, the first transistor sw1 and the fourth transistor sw4 are turned on and the second transistor sw2 and the third transistor sw3 are turned off, to form no third path ro3.

In the second normal mode N2 and the first safe mode Se1, when the switch s is changed from an off state to an on state, the reverse surge is generated in the coil c to change the voltage of the first node n1 from the high level H to the low level L and the voltage of the second node n2 from the low level L to the high level H. In addition, when the switch s is turned off in the second safe mode Se2 and the potential of the first node N1 becomes the ground potential, the reverse surge is generated, so that the voltage of the first node n1 is changed from the high level to the low level L. In addition, when the switch s is turned off in the third safety mode Se3 and the potential of the second node n2 becomes equipotential with a battery connected to the relay 10, the reverse surge is generated in the coil c, and thus the voltage of the second node n2 is changed from the low level L to the high level H.

The MCU 20 determines that the reverse surge has occurred in the coil c by sensing the voltages of the first node n1 and the second node n2, and generates the signals of the first control terminal t1 and the fourth control terminal t4 having the disable level L and the signals of the second control terminal t2 and the third control terminal t3 having the enable level H. Accordingly, the first transistor sw1 and the fourth transistor sw4 turned off and the second transistor sw2 and the third transistor sw3 are turned on, to form the third path ro3 through the second transistor sw2 and the third transistor sw3.

The reverse surge flowing along the third path ro3 causes a voltage drop due to internal resistance components of the second transistor se2 and the third transistor sw3. Accordingly, the generated reverse surge is reduced as it passes through the third path ro3.

Table 3 below summarizes a case in which the third path ro3 according to the above-described exemplary embodiment is generated.

TABLE 3

| Mode | t1 | t2 | t3 | t4 | s1 | s2 | Switch s | Reduction path |
|---|---|---|---|---|---|---|---|---|
| I | L | L | L | L | L | L | OFF | — |
| N1 | L->H | H->L | L | H | H | L | ON | — |
| N2 | H->L | L->H | L->H | H->L | H->L | L->H | OFF | ro3 |
| Se1 | H->L | L->H | L->H | H->L | H->L | L->H | OFF | ro3 |
| Se2 | H->L | L->H | L->H | H->L | H->L | — | OFF | ro3 |
| Se3 | H->L | L->H | L->H | H->L | — | L->H | OFF | ro3 |

In the above, for convenience of description, the first to fourth transistors sw1 to sw4 have been described as nMOS transistors, but the exemplary embodiments are not limited thereto, and may be implemented with other types of n-channel transistors or p-channel transistors.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Accordingly, the above detailed description should not be construed as limiting in all aspects and should be considered as illustrative. The scope of the present invention should be determined by reasonable interpretation of the appended claims, and all changes within the equivalent range of the present invention are included in the scope of the present invention.

The invention claimed is:

1. A battery control apparatus, comprising:
    an MCU including:
        a first control terminal;
        a first sensing terminal connected to a first node;
        a second control terminal;
        a third control terminal;
        a second sensing terminal connected to a second node; and
        a fourth control terminal,
    wherein the MCU is configured to sense voltage changes of the first node and the second node;
    a relay including a switch and a coil, the switch and the coil of the relay being connected between the first node and the second node; and
    a first reduction circuit including:
        a first transistor having a first gate connected to the first control terminal and a first end connected to the first node; and
        a second transistor having a second gate connected to the second control terminal, a first end connected to the first node, and a second end connected to the second node, and
    wherein when there is no voltage change in the first node, the MCU is configured to control the first gate and the second gate to respectively allow the first transistor to be turned on and the second transistor to be turned off.

2. The battery control apparatus of claim 1, wherein when a voltage of the first node is changed from a first voltage to a second voltage, the MCU is configured to control the second gate to form a first path via the second transistor.

3. The battery control apparatus of claim 1, wherein when a potential of the first node becomes a ground potential, the MCU is configured to control the switch to be turned off.

4. The battery control apparatus of claim 2, further comprising a second reduction circuit including:
    a third transistor including:
        a third gate connected to the third control terminal;
        a first end connected to the first node;
        a second end connected to the second node; and
    a fourth transistor having including:
        a fourth gate connected to the fourth control terminal;
        a first end connected to the second node; and
        a second end connected to a ground.

5. The battery control apparatus of claim 4, wherein wherein when there is no voltage change in the second node, the MCU is configured to control the third gate and the fourth gate to respectively allow the third transistor to be turned off and the fourth transistor to be turned on.

6. The battery control apparatus of claim 5, wherein when a voltage of the second node is changed from the second voltage to the first voltage, the MCU controls the third gate to form a second path via the third transistor.

7. The battery control apparatus claim 6, wherein when there is no voltage change in the first node and the second node, the MCU is configured to control the first gate to the fourth gate to respectively allow the first transistor and the fourth transistor to be turned on and the second transistor and the third transistor to be turned off.

8. The battery control apparatus of claim 7, wherein when the voltage of the first node is changed from the first voltage to the second voltage and the voltage of the second node is changed from the second voltage to the first voltage, the MCU is configured to respectively control the second gate and the third gate to form a third path via the second transistor and the third transistor.

9. The battery control apparatus of claim 8, wherein the switch is turned on or off depending on a magnetic field generated by the coil.

10. The battery control apparatus of claim 9, wherein the first voltage is higher than the second voltage.

\* \* \* \* \*